United States Patent
Yokai et al.

(10) Patent No.: US 7,852,026 B2
(45) Date of Patent: Dec. 14, 2010

(54) MOTOR DRIVE APPARATUS AND MOTOR DRIVE CONTROL METHOD

(75) Inventors: Masatoshi Yokai, Kariya (JP); Atsushi Kanamori, Nukata-gun (JP)

(73) Assignee: DENSO CORPORATION, Kariya (JP)

(*) Notice: Subject to any disclaimer, the term of this patent is extended or adjusted under 35 U.S.C. 154(b) by 374 days.

(21) Appl. No.: 12/153,462

(22) Filed: May 20, 2008

(65) Prior Publication Data

US 2008/0291589 A1 Nov. 27, 2008

(30) Foreign Application Priority Data

May 22, 2007 (JP) .............................. 2007-135450

(51) Int. Cl.
*H02H 7/08* (2006.01)
*H02H 7/09* (2006.01)
(52) U.S. Cl. .................. 318/400.21; 318/685; 318/779; 318/801; 361/23; 361/31; 361/33
(58) Field of Classification Search ................. 318/254, 318/439, 400.21, 685, 768, 779, 801; 361/23, 361/31, 33
See application file for complete search history.

(56) References Cited

U.S. PATENT DOCUMENTS

| | | | |
|---|---|---|---|
| 7,057,361 B2 | 6/2006 | Kitahata et al. | |
| 7,355,939 B2 * | 4/2008 | Wu et al. | 369/47.41 |
| 7,375,934 B2 * | 5/2008 | Wang et al. | 361/23 |
| 7,482,777 B2 * | 1/2009 | Tomigashi | 318/807 |
| 7,525,278 B2 * | 4/2009 | Ochiai et al. | 318/779 |
| 7,598,698 B2 * | 10/2009 | Hashimoto et al. | 318/801 |
| 7,619,385 B2 * | 11/2009 | Suzuki et al. | 318/705 |
| 7,728,537 B2 * | 6/2010 | Tomigashi | 318/400.02 |
| 2005/0134494 A1 * | 6/2005 | Kohara | 341/155 |
| 2006/0061923 A1 * | 3/2006 | Wang et al. | 361/23 |
| 2007/0027232 A1 * | 2/2007 | Walsh et al. | 523/218 |
| 2007/0040529 A1 * | 2/2007 | Takebayashi et al. | 318/685 |
| 2007/0200521 A1 * | 8/2007 | Ochiai et al. | 318/376 |
| 2008/0037961 A1 * | 2/2008 | Wu et al. | 388/832 |
| 2008/0061728 A1 * | 3/2008 | Tomigashi | 318/768 |
| 2008/0079385 A1 * | 4/2008 | Hashimoto et al. | 318/801 |
| 2008/0252250 A1 * | 10/2008 | Hida et al. | 318/801 |

FOREIGN PATENT DOCUMENTS

JP A-2000-69786 3/2000

* cited by examiner

*Primary Examiner*—Paul Ip
(74) *Attorney, Agent, or Firm*—Posz Law Group, PLC

(57) ABSTRACT

A protection circuit is configured to change control modes in a drive control process of a drive circuit for a motor when overvoltage is applied to a power source line while the motor is driven. With overvoltage applied, the control process is changed to a control mode to perform forced commutation control. When a predetermined time period passes after the voltage of the power source line returns to a predetermined level, the control process is changed to a sensorless control mode using a position detection circuit. This configuration can provide a motor drive apparatus capable of performing an overvoltage protection operation appropriately even when the sensorless control mode is adopted.

18 Claims, 9 Drawing Sheets

[PATTERN 1]

[PATTERN 2]

US 7,852,026 B2

MOTOR DRIVE APPARATUS AND MOTOR DRIVE CONTROL METHOD

CROSS REFERENCE TO RELATED APPLICATION

This application is based on and incorporates herein by reference Japanese Patent Application No. 2007-135450 filed on May 22, 2007.

FIELD OF THE INVENTION

The present invention relates to a motor drive apparatus and a motor drive control method, in which a phase voltage of a motor is detected to thereby detect a rotational position of a rotor in driving a brushless DC motor.

BACKGROUND OF THE INVENTION

For example, in an apparatus for driving an in-vehicle motor, to secure a protection in cases where overvoltage occurs owing to load dumping, a measure may be taken which inserts a Zener diode in a power source line to thereby clamp the overvoltage. Power Zener diodes are comparatively expensive. Further, if a Zener diode is selected to have high withstand voltage as a measure against the overvoltage, it becomes more expensive. This poses a problem of increasing the product price. Patent Document 1 describes a technology in which a motor is rotated on maximum output conditions to thereby consume electric power upon detecting an overvoltage applied.

There is a so-called (position) sensorless drive system that estimates a position of a rotor by detecting a phase voltage generated on the motor, without using a position detection element such as a Hall sensor in driving a brushless DC motor. If the above mentioned technology in Patent Document 1 is applied to an apparatus using such a sensorless drive system, the following problem may occur. For instance, if a control described in the above mentioned technology is applied during performing a drive control using the sensorless drive system, position detection signals acquired based on induced voltage fluctuate to thereby fluctuate timing for applying electric current to the motor. As a result, applying electric current may be concentrated on a specific phase or irregular in applying order so that electric power cannot be consumed. Thus, overvoltage protection may not be appropriately performed.

Patent Document 1: JP 2000-69786 A

SUMMARY OF THE INVENTION

The present invention is made in view of the above situation. It is an object to provide a motor drive apparatus and a motor drive control method of intending appropriate overvoltage protection even when a position sensorless system is adopted.

According to an example of the present invention, a motor drive apparatus is provided as follows. A rotational position estimation device is configured to estimate a rotational position of a rotor by detecting a phase voltage generated in a stator coil of a brushless DC motor. A drive control device is configured to perform a drive control process of the motor in a first control mode, which is based on the estimated rotational position. A voltage detection device is configured to detect a voltage of a power source line. A rotational frequency detection device is configured to detect a rotational frequency of the motor. A control change device is configured to change the drive control process in the drive control device to a second control mode so as to perform a forced commutation of the motor based on a rotational frequency detected by the rotational frequency detection device when it is detected by the voltage detection device that overvoltage is applied when the motor is driven.

According to another example of the present invention, a motor drive apparatus is provided as follows. A rotational position estimation device is configured to estimate a rotational position of a rotor by detecting a phase voltage generated in a stator coil of a brushless DC motor. A drive control device is configured to perform a drive control process of the motor in a first control mode, which is based on the estimated rotational position. An overvoltage detection device is configured to detect that overvoltage is applied to a power source line. Herein, the drive control device performs the control process in a second control mode so as to perform a forced commutation of the motor when overvoltage is detected by the overvoltage detection device when the motor is stopped.

According to another example of the present invention, a method is provided for a motor drive control. The method comprises: detecting a phase voltage generated in a stator coil of a brushless DC motor; estimating a rotational position of a rotor based on the detected phase voltage; performing a drive control process of the motor in a first control mode, which is based on the estimated rotational position; detecting that overvoltage is applied to a power source line when the motor is driven; detecting a rotational frequency of the motor when it is detected that the overvoltage is applied to the power source line; and changing the drive control process to a second control mode so as to perform a forced commutation of the motor based on the detected rotational frequency when it is detected that the overvoltage is applied.

According to yet another example of the present invention, a method is provided for a motor drive control. The method comprises: detecting a phase voltage generated in a stator coil of a brushless DC motor; estimating a rotational position of a rotor based on the detected phase voltage; performing a drive control process of the motor in a first control mode, which is based on the estimated rotational position; and changing the drive control process to a second control mode so as to perform a forced commutation of the motor when detecting that an overvoltage is applied to a power source line when the motor is stopped.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
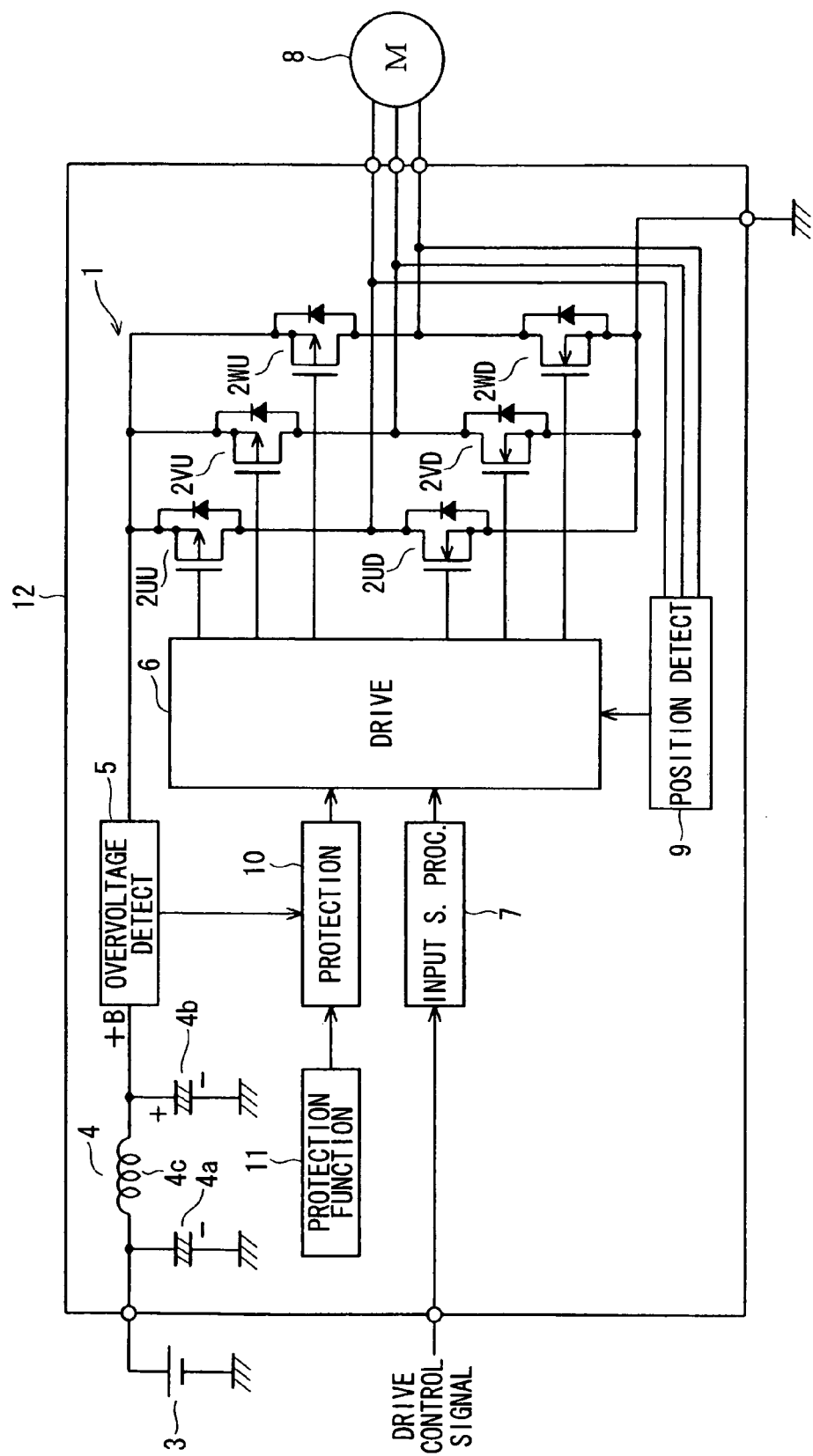
FIG. 1 is an overall configuration of a motor drive apparatus according to a first embodiment of the present invention.

A first embodiment of the present invention is directed to an inverter apparatus used for a cooler apparatus (radiator) in a vehicle. The first embodiment is explained with reference to FIGS. 1 to 4. FIG. 1 illustrates an overall configuration of a motor drive apparatus 13. An inverter circuit 1 includes a three phase bridge rectifier connection of six MOSFETs (Metal-Oxide Semiconductor Field-Effect Transistor) 2UU, 2VU, 2WU as semiconductor switching elements (upper arm side, P channel), 2UD, 2VD, 2WD (lower arm side, N channel). The inverter circuit 1 is supplied with direct current (DC) power supply from a battery 3 of the vehicle via an overvoltage detection device 5 as a voltage detection device and an n-type filter 4 having capacitors 4a, 4b and a coil 4c.

A drive circuit 6 as a drive control device has a microcomputer to output a PWM driving signal to a gate of each FET 2 included in the inverter circuit 1 according to a drive control signal provided from an outside via an input signal processor 7. The input signal processor 7 performs a conversion process, for instance, from the PWM signal to a level signal. Each phase winding of a brushless DC motor 8 is coupled to each phase output terminal of the inverter circuit 1. The DC motor 8 rotates a radiator fan of a cooler apparatus.

Each phase output terminal of the inverter circuit 1 is connected to an input terminal of a position detection circuit 9 functioning as a rotational position estimation device or a rotational frequency detection device. For example, the position detection circuit 9 uses a sensorless detection system such as an analog filter system, a reference voltage system, or a neutral point potential comparison system. The position detection circuit 9 thus generates a rotational position signal and outputs it to the drive circuit 6.

The overvoltage detection device 5 may detect that a surge voltage more than a first reference voltage VR1 is applied to a power source line, for example, by load dumping. In such a case, an overvoltage protection start signal is outputted to a protection circuit 10 functioning as a control change device. Then, when the level of the overvoltage decreases less than a second reference voltage VR2 lower than the first reference voltage VR1, an overvoltage protection end signal is outputted to the protection circuit 10. The protection circuit 10 thereby outputs, to the drive circuit 6, a signal according to the protection start signal or protection end signal.

In addition, several protection function devices 11 detect, for example, an overcurrent state about power supply electric current and an overheated state about FET 2 using various kinds of sensors or detectors. Detection results are outputted to the protection circuit 10. The protection circuit 10 thereby outputs, to the drive circuit 6, a signal for executing an operation according to each kind of the above states.

The drive circuit 6 starts or activates the motor 8 by using a forced current application (forced commutation) control mode of the drive control process. When a rotational frequency of the motor 8 thereafter increases to thereby reach a certain value after a predetermined time period, the drive circuit 6 change the drive control process from the forced commutation control mode to the sensorless control mode. That is, a current applying change timing for the motor 8 is determined with reference to the rotational position signal outputted by the position detection circuit 9. The motor drive apparatus 12 is thus configured to include the above mentioned devices or the like excluding the battery 3 and the motor 8 in FIG. 1.

Figure 2:
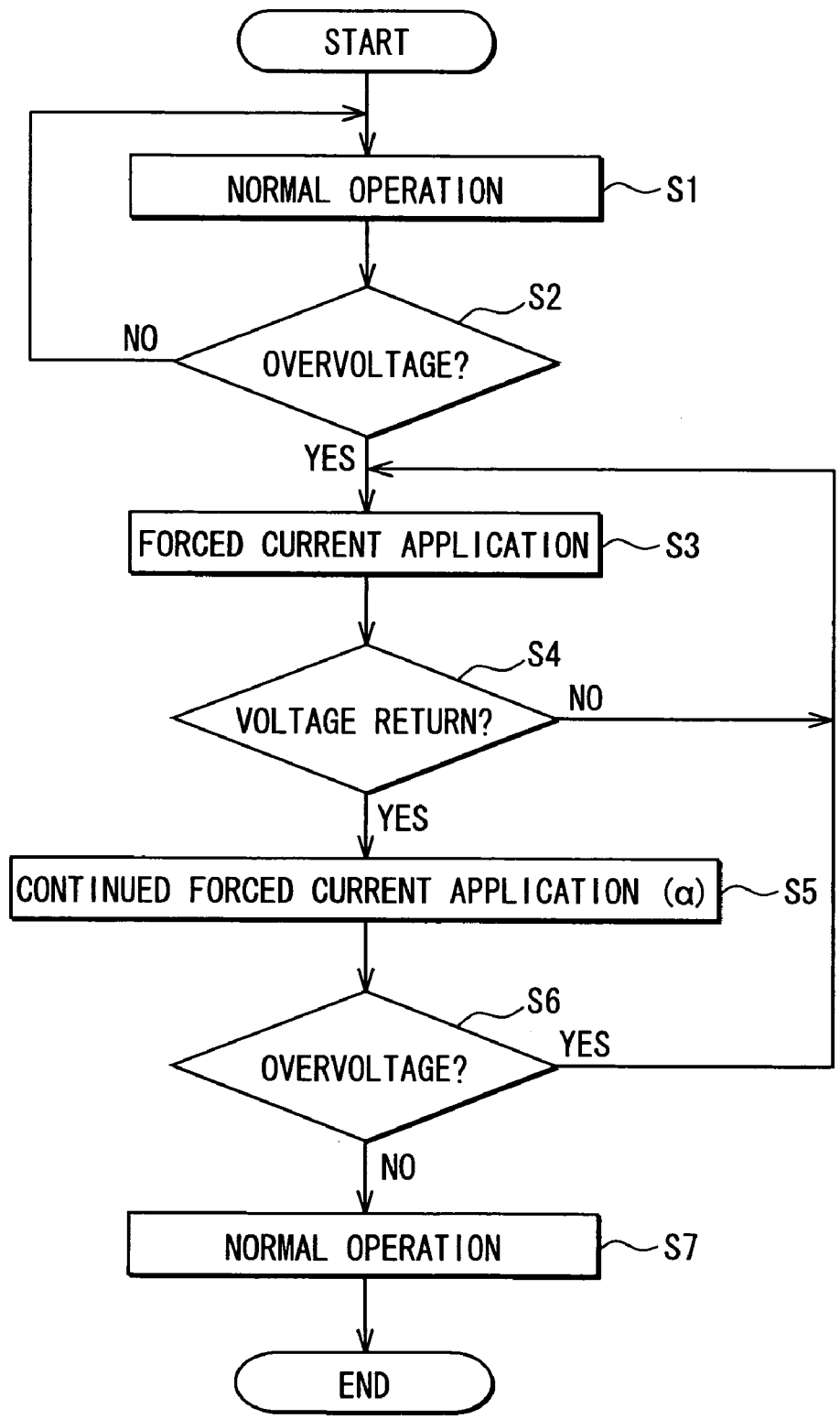
FIG. 2 is a flow chart illustrating a control process according to the first embodiment.
Figure 3:
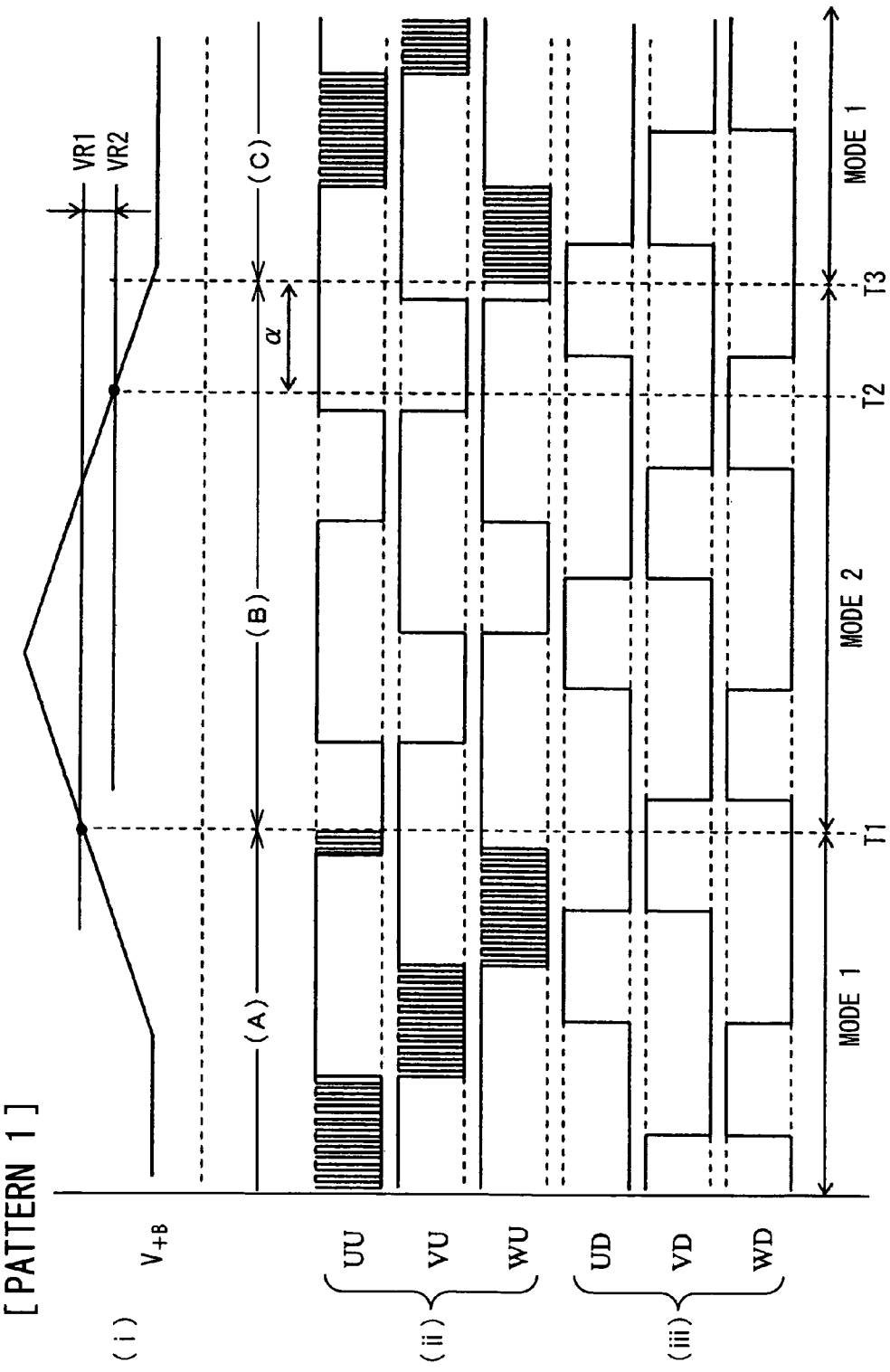
FIG. 3 is a first timing chart illustrating waveforms while an overvoltage protection operation is executed.

Next, FIG. 2 and FIG. 3 are also referred to and explained about an operation of the present embodiment. FIG. 2 is a flowchart which illustrates a drive control process mainly relating to the protection circuit 10. FIG. 3 is a timing chart which illustrates waveforms generated while an overvoltage protection operation is executed by the drive circuit 6. In a normal operation state after activating or starting the motor 8, the drive circuit 6 executes, as mode 1, a sensorless control mode (i.e., rotational frequency control mode) of the drive control process at S1 in FIG. 2 and in (A) of FIG. 3. In such a case, as shown in (ii) in FIG. 3, a PWM (Pulse Width Modulation) control takes place by switching the FET 2UU, 2VU, 2WU in the upper arm side.

As shown in (i) of FIG. 3, for instance, because of load dumping having occurred, a voltage +B of the battery 3 may rise and exceed the first reference voltage VR1 (for example, 30 V) at a time point T1, corresponding to YES at S2. In such a case, the overvoltage detection device 5 outputs an overvoltage protection start signal to the protection circuit 10; according to the overvoltage protection start signal, the protection circuit 10 outputs a signal; and the drive circuit 6 changes the drive control process of the motor 8 to the forced current application mode, as mode 2, based on a rotational frequency obtained from the rotational position signal at the time point T1, at S3 and in (B) of FIG. 3. Here, a PWM duty is designated at 100% and the motor 8 is accelerated such that the rotational frequency of the motor 8 reaches the highest. Thus, the energy of the overvoltage applied to the power source line is consumed in a short time period as much as possible.

In the time period (from T1 to T3) illustrated in (B) of FIG. 3, the overvoltage level of the power source line decreases by rotating the motor 8 with the forced current application mode. When the overvoltage detection device 5 detects that the voltage +B becomes less than the second reference voltage VR2 (for example, 25V), it is determined that the overvoltage level is returning to the normal level, corresponding to YES at S4. In such a case, the overvoltage detection device 5 outputs an overvoltage protection end signal to the protection circuit 10 at a time point T2. Accordingly, the protection circuit 10 then outputs a corresponding signal to the drive circuit 6.

However, the drive circuit 6 then stands by (or continues the forced current application mode) until a predetermined time period a passes (i.e., from T2 to T3) at S5. It is because the rotational frequency of the motor 8 is checked in the time period α. If another overvoltage is not detected during the predetermined time period α, corresponding to NO at S6, the processing proceeds to S7, where the drive control process of the motor 8 is changed to thereby again return to the sensorless control mode (mode 1) as shown in (C) of FIG. 3.

Figure 4:
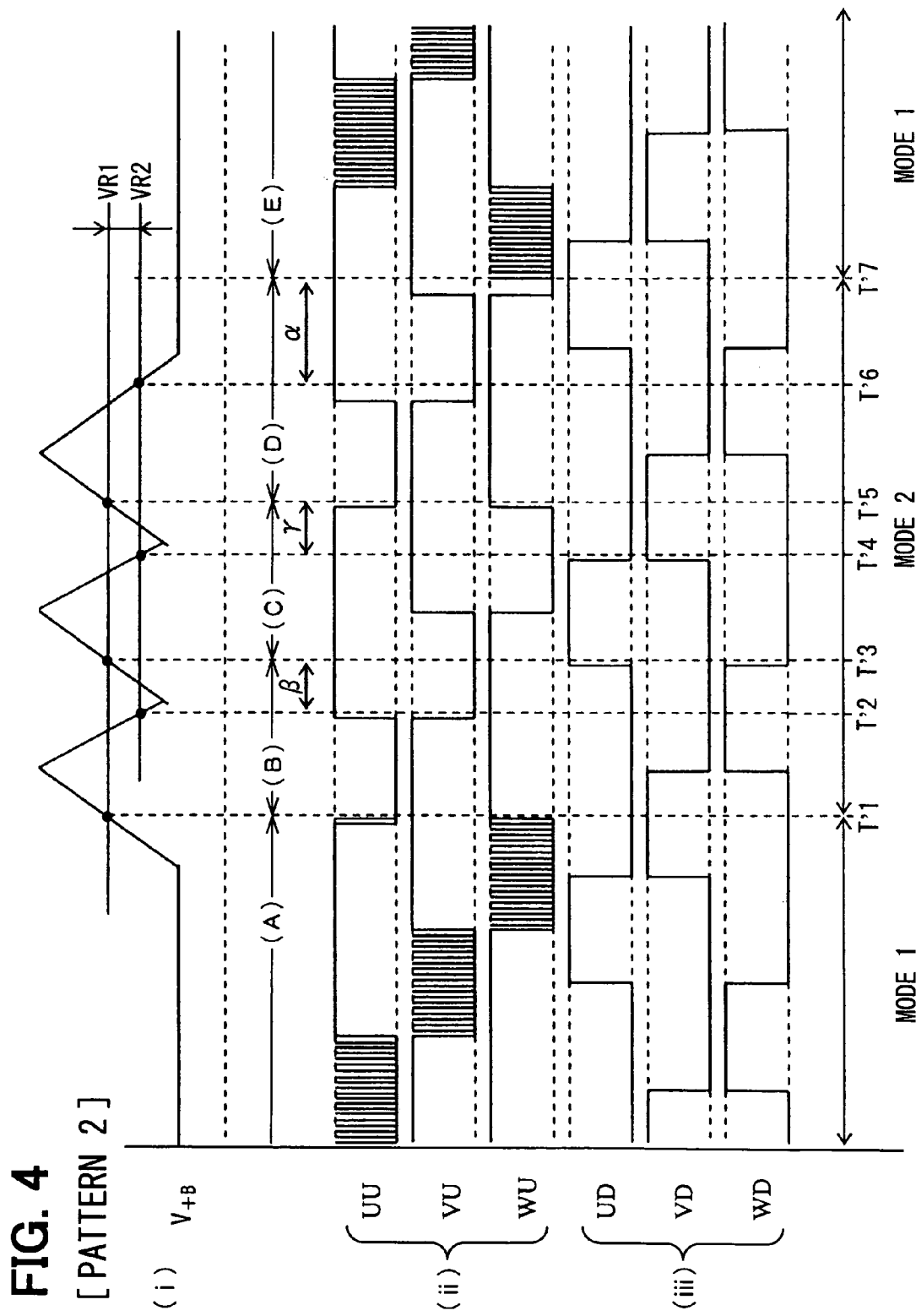
FIG. 4 is a second timing chart illustrating waveforms while an overvoltage protection operation is executed.

In contrast, FIG. 4 illustrates waveforms when a sequence of overvoltage detection-> overvoltage protection start signal output-> control switch signal output is repeated before the predetermined time period a passes, which corresponds to YES at S6 in FIG. 2. That is, in (B) of FIG. 4, although the voltage +B is once less than the second reference voltage VR2, the first reference voltage VR1 is again exceeded after a time period β((T'2 to T'3)<α). In such a case, the processing returns to S3. Therefore, the forced current application mode, which is based on the rotational frequency of the motor 8 at the time point T1' in FIG. 4 is repeated in (C) (T'3 to T'5) of FIG. 4. In addition, if the voltage +B is again less than the second reference voltage VR2 and then exceeds the first reference voltage again after a time period γ ((T'4 to T'5)<α) in (C) of FIG. 4, the processing returns to S3, similarly. Therefore, the forced current application mode, which is based on the rotational frequency of the motor 8 at the time point T1' in FIG. 4. is repeated in (D) (T'5 to T'7 via T'6) of FIG. 4. Herein, during the time period a from T'6 to T'7, the voltage +B does not exceed the first reference voltage again; thus, the processing proceeds to S7, wherein the sensorless control mode (mode 1) is performed as shown in (E) of FIG. 4.

According to the present embodiment, the protection circuit 10 is configured to change a drive control process of the drive circuit 6 when overvoltage is applied to a power source line while the motor 8 is driven. With overvoltage applied, the drive control process is changed so as to perform a forced current application mode to commute the motor 8 based on the rotational frequency at the time point when the overvoltage is detected. Therefore, also in the configuration where the sensorless drive or sensorless control mode of the motor 8 is performed based on the rotational position estimated by the position detection circuit 9, the forced commutation of the motor 8 is performed to thereby secure a protection by consuming the energy of the overvoltage when the overvoltage is applied. This can prevent a problem that the sensorless drive control becomes unstable or results in a step-out state. Further, in the forced commutation of the motor 8, executing the acceleration control is continued until the motor 8 reaches the maximum rotational frequency (the maximum number of rotations); therefore, the energy of overvoltage can be consumed in a shorter time period.

In addition, at a time point when the voltage of the power source line falls to the predetermined level during the forced commutation of the motor 8, the protection circuit 10 switches the motor drive control process from the forced current application control mode to the sensorless control mode which uses the position detection circuit 9 after the predetermined time period passes since the time point. The drive circuit 6 can check the rotational frequency of the motor 8 before the predetermined time period passes. This enables smooth change to the sensorless control mode. Further, when it is detected again that overvoltage is applied before the predetermined time period passes, the forced commutation of the motor is repeated based on the rotational frequency detected at the time point when switching to the forced commutation mode. Therefore, even when application of overvoltage occurs continually in a short time period, protection can be aimed at certainly.

Second Embodiment

Figure 5:
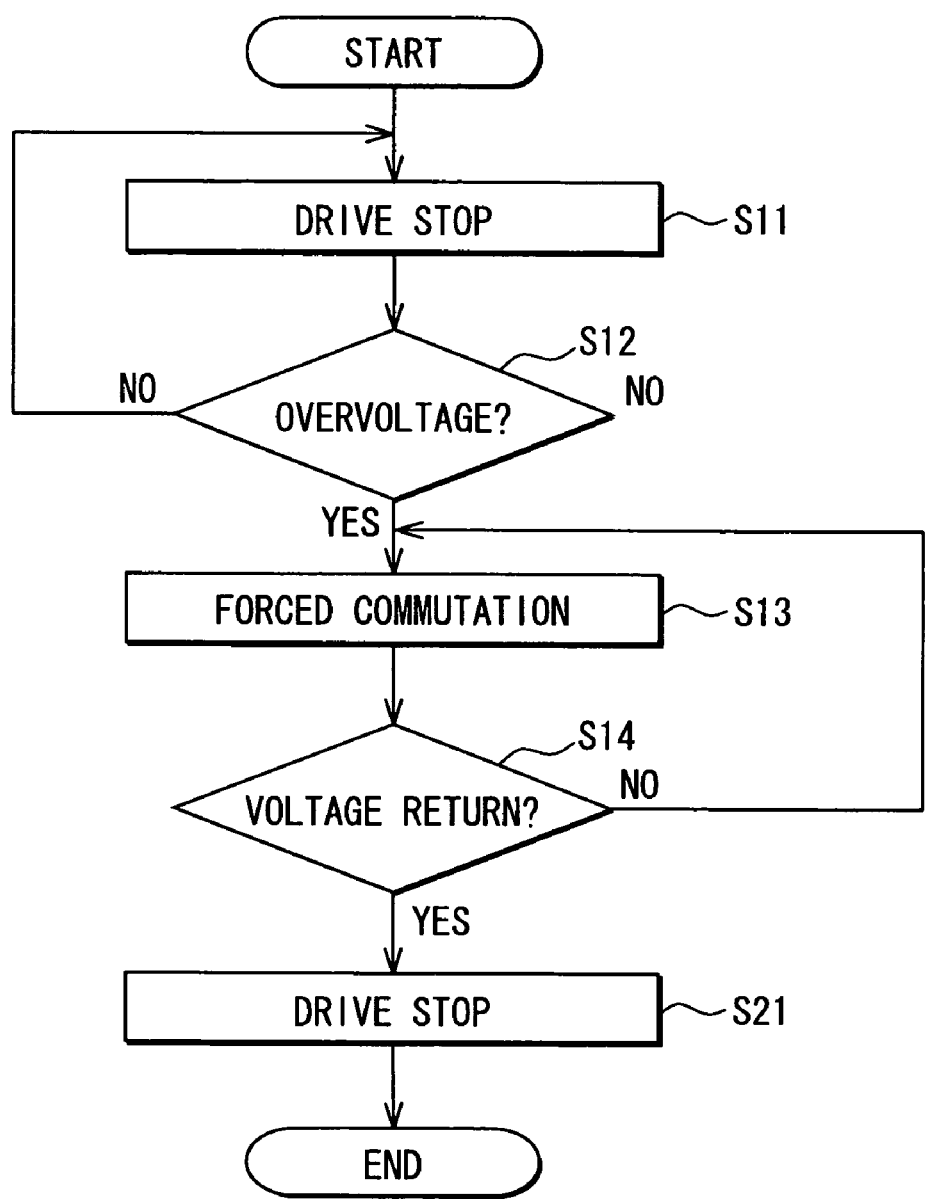
FIG. 5 is a flow chart illustrating a control process according to a second embodiment of the present invention.
Figure 6:
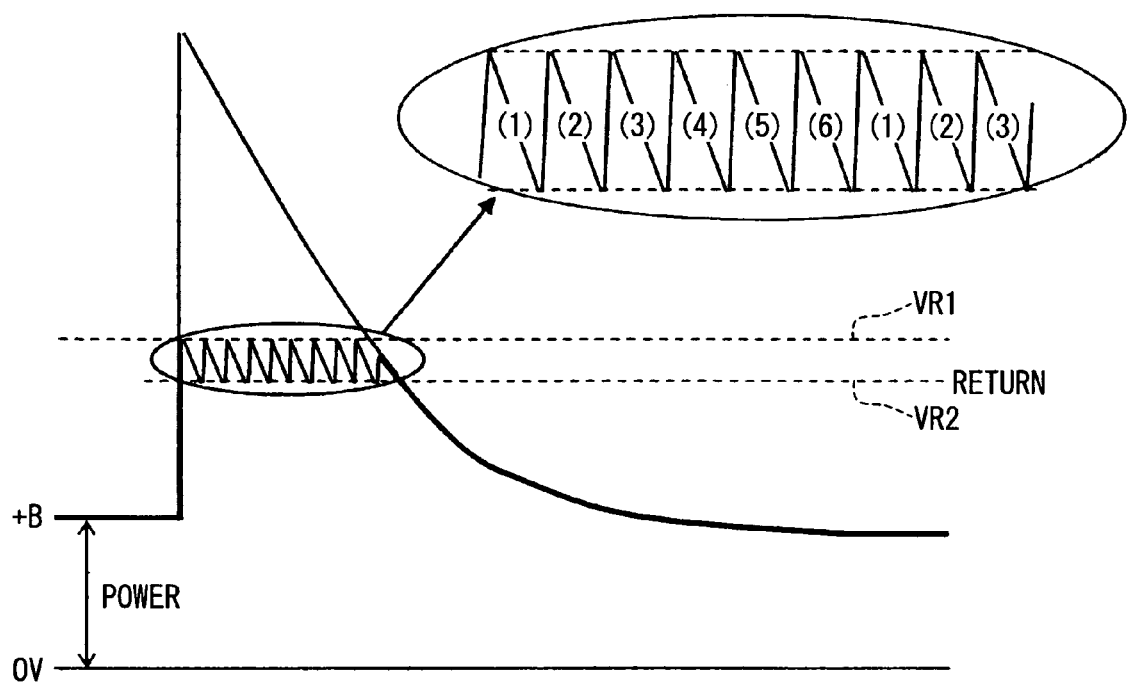
FIG. 6 is a timing chart illustrating waveforms when rotation of a motor stops according to the second embodiment.

FIG. 5 and FIG. 6 illustrate a second embodiment of the present invention. The same devices or the like as those of the first embodiment are assigned with the same reference numbers. Explanation is made mainly for different parts and omitted for the same devices or the like. The configuration of the second embodiment is basically the same as that of the first embodiment. Explanation is made for overvoltage protection operation executed when rotation of the motor 8 stops. FIG. 5 is a flowchart of the protection operation. FIG. 6 is a timing chart of the protection operation.

Under the rotation stop of the motor 8 at S11, the overvoltage detection device 5 detects that the voltage +B rises to thereby exceed the first reference voltage VR1, corresponding to YES at S12 to thereby output an overvoltage protection start signal. The protection circuit 10 then outputs a control switch signal to the drive circuit 6 like the first embodiment. Then, the drive circuit 6 changes the phases for current application according to a predetermined pattern and rotates the motor 8 by the forced current application at S13. The forced current application is continued while changing the phases according to the predetermined pattern until the voltage +B decreases less than the second reference voltage VR2, corresponding to YES at S14. That is, as illustrated in FIG. 6, the phases for current application are changed in order such as (1) U->V, (2) U->W, (3) V->W, (4) V->U, (5) W->U, (6) W->V, (1) U->V, . . . , each time the overvoltage is detected. The motor 8 is thereby rotated; therefore, the energy of the overvoltage is consumed.

According to the second embodiment, as mentioned above, the drive circuit 6 performs the forced commutation by switching, in order, the current application phases of the motor 8 according to the predetermined pattern when application of overvoltage is detected while the rotation of the motor 8 stops. Therefore, even in the state where the rotation of the motor 8 stops, the energy of the overvoltage can be consumed by the forced commutation when overvoltage is applied. The protection can be thereby made.

Third Embodiment

Figure 7:
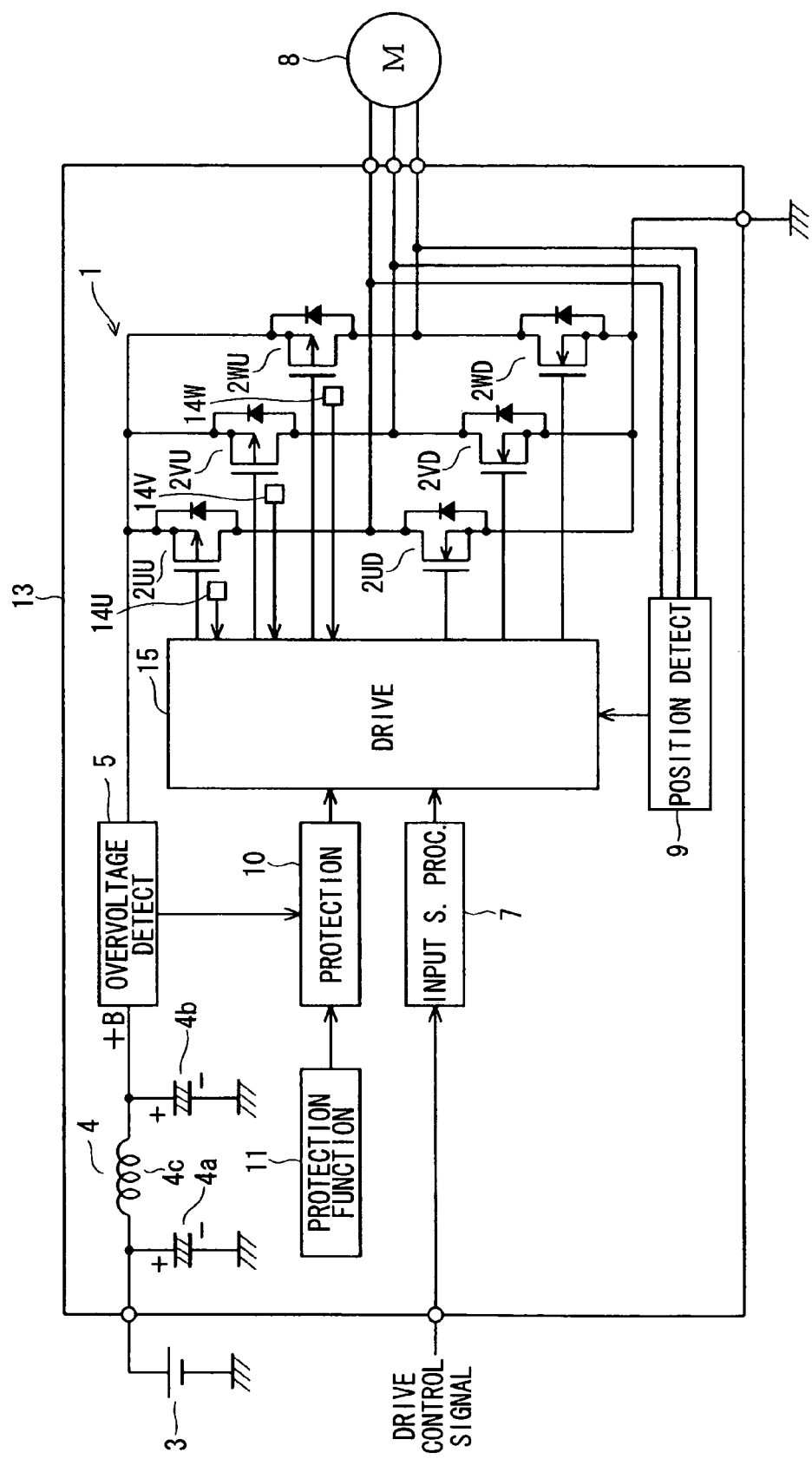
FIG. 7 is an overall configuration of a motor drive apparatus according to a third embodiment of the present invention.
Figure 8:
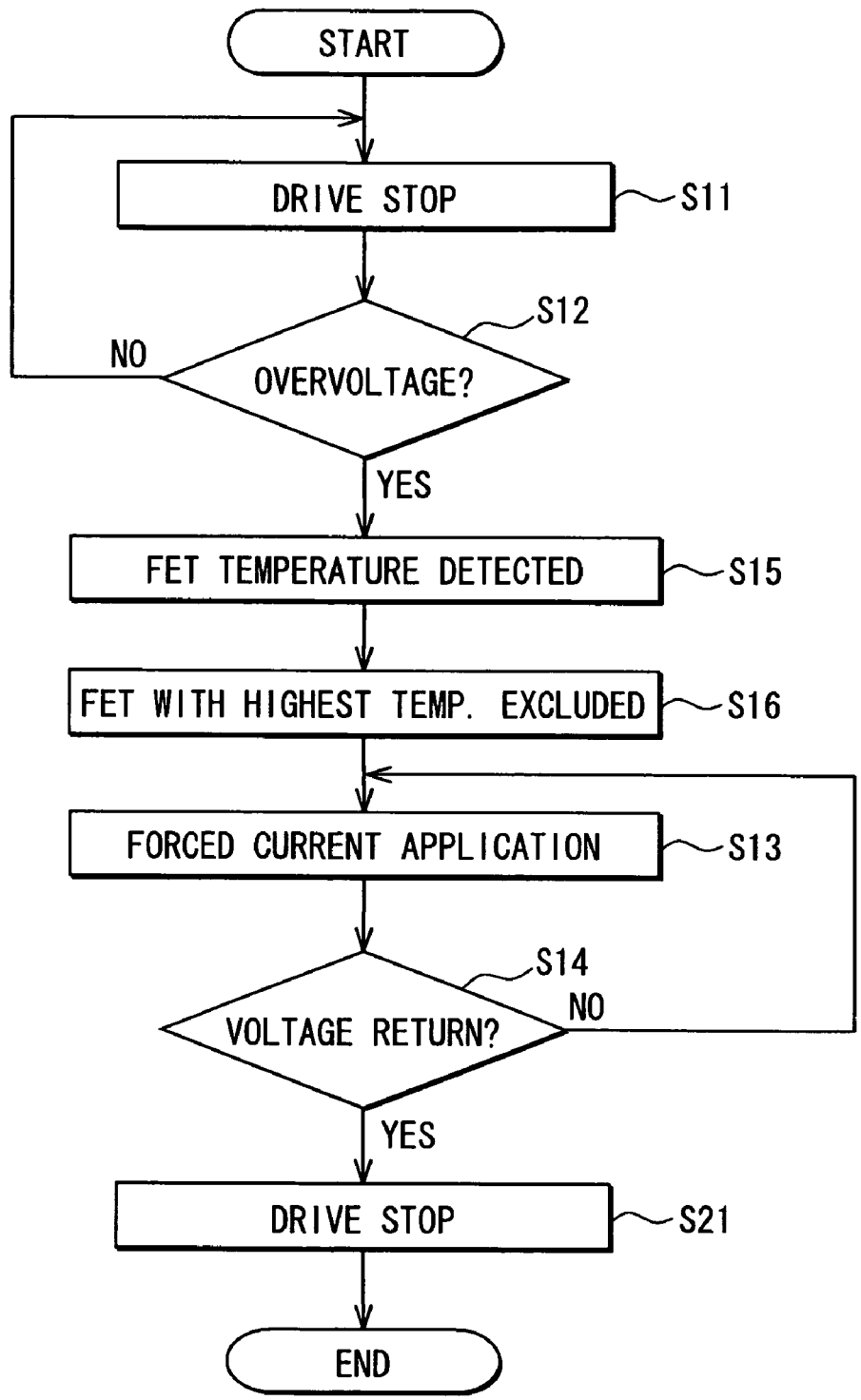
FIG. 8 is a flow chart illustrating a control process according to the third embodiment.
Figure 9:
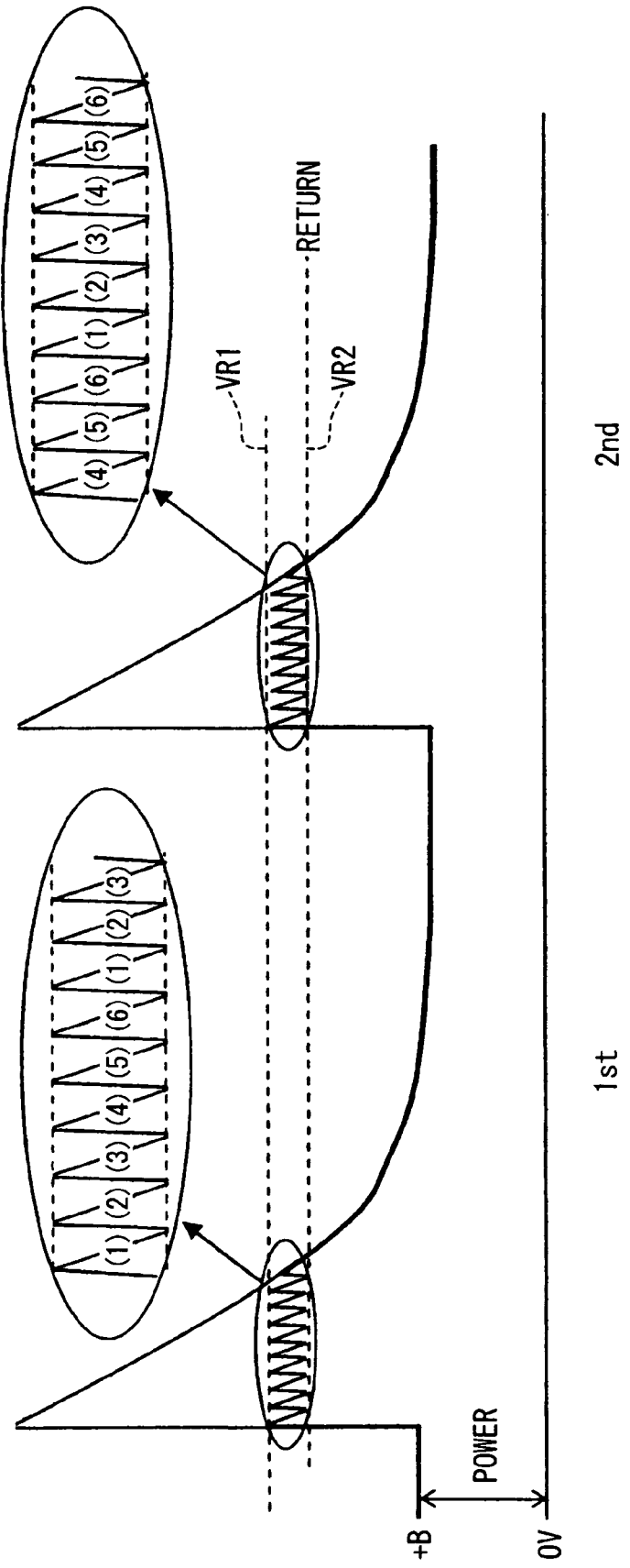
FIG. 9 is a timing chart illustrating waveforms when rotation of a motor stops according to the third embodiment.

FIGS. 7 to 9 illustrate a third embodiment of the present invention. Explanation is made mainly for parts different from the second embodiment. In FIG. 7 illustrating a configuration of a motor drive apparatus 13, temperature sensors 14U, 14V, 14W are arranged at the FET 2UU, 2VU, 2WU, respectively, in the upper arm side of the inverter circuit 1 and those sensor signals are provided to the drive circuit 15 as a drive control device.

In the process illustrated in FIG. 8, the overvoltage is detected when the motor 8 is stopped, which corresponds to YES at S12. The drive circuit 15 then detects a temperature of each FET 2UU, 2VU, and 2WU at S15. The drive circuit 15 designates a phase for current application which does not contain the FET 2 having the highest temperature and starts a forced current application pattern with the designated phase at S16. The processing then proceeds to S13. Herein, the overvoltage may be detected first at the state in which the motor 8 is stopped for a comparatively long time period. In such a case, it is assumed that the difference hardly arises between the temperatures of the FETs 2UU, 2VU, 2WU; therefore, changing the phases can be started from (1) like the second embodiment, as shown in the left part or the first period in FIG. 9.

For example, as illustrated in FIG. 9, when generation of the overvoltage continually takes place with a small time interval therebetween, such as between the first period and the second period illustrated in FIG. 9, the same current application pattern as that of the second embodiment is performed at the first period. In contrast, it is assumed that the temperature of the FET 2WU is the highest at S15 at the time of the second overvoltage generation as shown in the right part or the second period in FIG. 9. In such a case, at S16, the phase change is set to designate (4) V->U at the beginning. The processing then proceeds to S13, where the current application pattern is executed from the designated (4) V->U.

That is, if the phase, to which electric current is applied at the beginning in the forced commutation pattern, is fixed, the number of times of the current applications to a specific FET 2 increases among the FETs 2UU, 2VU, 2WU. The temperature of the specific FET 2 possibly rises more highly. To that end, the phase to which electric current is applied at the first time (or initially), is changed one by one each time the forced commutation of the motor 8 is started. The deviation in the number of times of current applications to FETs 2UU, 2VU, 2WU is reduced. The deviation in the temperature rise degree of each FET 2UU, 2VU, and 2WU is also reduced.

According to the third embodiment, the drive circuit 15 changes a current applied phase of the motor 8, which is initially applied, in the predetermined pattern each time performing the forced commutation. For instance, changing the phase is made so that the switching element having the highest temperature specifically detected by the temperature sensor can be avoided in the forced commutation. Therefore, the FET 2 with the highest temperature is designated to be avoided with the temperature sensor 14 to thereby restrict the excessive temperature rise.

The present invention is not limited to the embodiments described above and illustrated in the drawings, and can be modified or extended as follows. The drive circuit may be a custom IC (integrated circuit) instead of the microcomputer. The first or second reference voltage may be set as needed according to individual designs. The first and second reference voltages may be set at a similar level so as to be common. When performing the forced commutation mode of the motor, it is not necessary to accelerate to the maximum frequency. Instead, acceleration may be applied for only a predetermined time period or may be performed to reach a predetermined rotational frequency. In addition, the rotational frequency may be set at a constant value. In the forced commutation of the motor from the stopped state, without using the temperature sensors 14 like the third embodiment, the initial current applied phase may be changed one by one in a predetermined pattern such as ((1)->(2)->(3)-> . . . , (2)->(3)->(4)-> . . . , (3)->(4)->(5)-> . . . ). In addition, the initial current applied phase may be designated at random.

Any combination of the first, second, and third embodiments may be allowed. The PWM control can be made by the FETs 2UD, 2VD, and 2WD at the lower arm side. In such a case, the temperature sensors 14 of the third embodiment may be arranged for the FETs 2UD, 2VD, and 2WD. In addition, the temperature sensors may be arranged or attached to all the FETs 2 regardless of applying the PWM control for either the FETs at the upper arm side or those at the lower arm side. When three upper arm side FETs or three lower arm side. FETs may be integrated into one chip, only one temperature sensor may be arranged to the one chip. The number of phases of the inverter circuit may not be limited to three, but may be two or more than three. The semiconductor switching element may be a bipolar transistor or IGBT, without restricting to the FET. The present invention may not be directed only to an in-vehicle fan motor and may be directed to any one that requires an overheat protection measurement of a semiconductor switching element in controlling a motor drive with an inverter circuit.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As a first aspect of the disclosure, a motor drive apparatus is provided as follows. A rotational position estimation device is configured to estimate a rotational position of a rotor by detecting a phase voltage generated in a stator coil of a brushless DC motor. A drive control device is configured to perform a drive control process of the motor in a first control mode, which is based on the estimated rotational position. A voltage detection device is configured to detect a voltage of a power source line. A rotational frequency detection device is configured to detect a rotational frequency of the motor. A control change device is configured to change the drive control process in the drive control device to a second control mode so as to perform a forced commutation of the motor based on a rotational frequency detected by the rotational frequency detection device when it is detected by the voltage detection device that overvoltage is applied when the motor is driven.

Therefore, also in the configuration where the sensorless drive or sensorless control mode of the motor is performed based on the estimated rotational position, the forced commutation of the motor is performed to thereby secure a protection by consuming the energy of the overvoltage when the overvoltage is applied. This can prevent a problem that the sensorless drive control becomes unstable or results in a step-out state.

As an optional aspect of the motor drive apparatus of the first aspect, the control change device is configured to change the drive control process in the drive control device to the first control mode using the rotational position estimation device after a predetermined time period passes since a first time point when it is detected that a voltage of the power source line decreases to a predetermined level while performing the second control mode of the forced commutation of the motor. Therefore, the drive control device can grasp the rotational frequency of the motor, for the predetermined time period. The change to the control mode using the rotational position estimation device can be executed smoothly.

As an optional aspect of the motor drive apparatus of the first aspect, when it is detected again that the overvoltage is applied to the power source line before the predetermined time period passes, the control change device is configured to again perform the second control mode of the forced commutation of the motor based on the rotational frequency detected at the first time point. Therefore, even when application of overvoltage occurs continually in a short time period, protection can be aimed at certainly.

As a second aspect of the disclosure, a motor drive apparatus is provided as follows. A rotational position estimation device is configured to estimate a rotational position of a rotor by detecting a phase voltage generated in a stator coil of a brushless DC motor. A drive control device is configured to perform a drive control process of the motor in a first control mode, which is based on the estimated rotational position. An overvoltage detection device is configured to detect that overvoltage is applied to a power source line. Herein, the drive control device performs the control process in a second control mode so as to perform a forced commutation of the motor when overvoltage is detected by the overvoltage detection device when the motor is stopped.

Therefore, also in the configuration where the sensorless drive or sensorless control mode of the motor is performed based on the estimated rotational position, even in the state where the rotation of the motor stops, the energy of the overvoltage can be consumed by the forced commutation of the motor when overvoltage is applied. The protection can be thereby made appropriately.

As an optional aspect of the motor drive apparatus of the second aspect, the drive control device is configured to change, from among a plurality of phases, a current applied phase of the motor in a predetermined pattern each time application of overvoltage is detected by the overvoltage detection device.

As an optional aspect of the motor drive apparatus of the second aspect, the drive control device is configured to change, from among the plurality of phases, an initial current applied phase of the motor, the initial current applied phase to which current is applied initially when the drive control process is changed to the second control mode, in the predetermined pattern each time performing the forced commutation.

That is, if an initial current applied phase, to which electric current is applied at the first in the forced commutation pattern, is fixed, the number of times of the current application to the specific switching element increases among multiple switching elements which constitute the inverter etc. which drive the motor. The temperature of the specific switching element may thus rise more highly. To that end, the initial current applied phase is changed one by one each time the forced commutation of the motor is started. Since the deviation in the number of times of current applications of each switching element decreases, deviation in the temperature rise of each element can be lessened similarly.

As an optional aspect of the motor drive apparatus of the second aspect, a temperature sensor is further configured to detect a temperature of a switching element included in a drive circuit for driving the motor. Herein, when performing the forced commutation, the drive control device changes an initial current applied phase, to which current is applied initially when the drive control process is changed to the second control mode, in the predetermined pattern so as to avoid a switching element having a highest temperature detected by the temperature sensor. Therefore, the switching element with the highest temperature is designated to be avoided with the temperature sensor to thereby restrict the excessive temperature rise.

As an optional aspect of the motor drive apparatus of the second aspect, acceleration control is executed when carrying out the forced commutation of the motor; therefore, the energy of overvoltage can be consumed in a shorter time period.

As an optional aspect of the motor drive apparatus of the second aspect, in the forced commutation of the motor, executing the acceleration control is continued until the motor reaches the maximum rotational frequency (the maximum number of rotations); therefore, the energy of overvoltage can be consumed in a shorter time period.

As yet another aspect of the disclosure, a method is provided for achieving the above motor drive apparatus of either the first aspect or the second aspect of the disclosure.

It will be obvious to those skilled in the art that various changes may be made in the above-described embodiments of the present invention. However, the scope of the present invention should be determined by the following claims.

What is claimed is:

1. A motor drive apparatus comprising:
   a rotational position estimation device configured to estimate a rotational position of a rotor by detecting a phase voltage generated in a stator coil of a brushless DC motor;
   a drive control device configured to perform a drive control process of the motor in a first control mode, which is based on the estimated rotational position;
   a voltage detection device configured to detect a voltage of a power source line;
   a rotational frequency detection device configured to detect a rotational frequency of the motor; and
   a control change device configured to change the drive control process in the drive control device to a second control mode so as to perform a forced commutation of the motor based on a rotational frequency detected by the rotational frequency detection device when it is detected by the voltage detection device that overvoltage is applied when the motor is driven.

2. The motor drive apparatus according to claim 1, wherein the control change device is configured to change the drive control process in the drive control device to the first control mode using the rotational position estimation device after a predetermined time period passes since a first time point when it is detected that a voltage of the power source line decreases to a predetermined level while performing the second control mode of the forced commutation of the motor.

3. The motor drive apparatus according to claim 2, wherein when it is detected again that the overvoltage is applied to the power source line before the predetermined time period passes, the control change device is configured to again perform the second control mode of the forced commutation of the motor based on the rotational frequency detected at the first time point.

4. The motor drive apparatus according to claim 1, wherein when the forced commutation of the motor is performed, acceleration control is executed.

5. The motor drive apparatus according to claim 4, wherein when the forced commutation of the motor is performed, executing of the acceleration control is continued until the motor reaches a maximum rotational frequency.

6. A motor drive apparatus comprising:
   a rotational position estimation device configured to estimate a rotational position of a rotor by detecting a phase voltage generated in a stator coil of a brushless DC motor;
   a drive control device configured to perform a drive control process of the motor in a first control mode, which is based on the estimated rotational position; and
   an overvoltage detection device configured to detect that overvoltage is applied to a power source line,
   wherein the drive control device performs the control process in a second control mode so as to perform a forced commutation of the motor when overvoltage is detected by the overvoltage detection device when the motor is stopped.

7. The motor drive apparatus according to claim 6, wherein the drive control device is configured to change, from among a plurality of phases, a current applied phase of the motor in a predetermined pattern each time application of overvoltage is detected by the overvoltage detection device.

8. The motor drive apparatus according to claim 7, wherein the drive control device is configured to change, from among the plurality of phases, an initial current applied phase of the motor, the initial current applied phase to which current is applied initially when the drive control process is changed to the second control mode, in the predetermined pattern each time performing the forced commutation.

9. The motor drive apparatus according to claim 7, further comprising:
   a temperature sensor configured to detect a temperature of a switching element included in a drive circuit for driving the motor, wherein
   when performing the forced commutation, the drive control device changes an initial current applied phase, to which current is applied initially when the drive control process is changed to the second control mode, in the predetermined pattern so as to avoid a switching element having a highest temperature detected by the temperature sensor.

10. A method for a motor drive control, the method comprising:
- detecting a phase voltage generated in a stator coil of a brushless DC motor;
- estimating a rotational position of a rotor based on the detected phase voltage;
- performing a drive control process of the motor in a first control mode, which is based on the estimated rotational position;
- detecting that overvoltage is applied to a power source line when the motor is driven;
- detecting a rotational frequency of the motor when it is detected that the overvoltage is applied to the power source line; and
- changing the drive control process to a second control mode so as to perform a forced commutation of the motor based on the detected rotational frequency when it is detected that the overvoltage is applied.

11. The method according to claim 10, further comprising:
- changing the drive control process to the first control mode to estimate a rotational position after a predetermined time period passes since a first time point when it is detected that a voltage of the power source line decreases to a predetermined level while performing the second control mode of the forced commutation of the motor.

12. The method according to claim 11, further comprising:
- when it is detected again that the overvoltage is applied to the power source line before the predetermined time period passes,
- performing again the second control mode of the forced commutation of the motor based on the rotational frequency detected at the first time point.

13. The method according to claim 10, further comprising:
- performing an acceleration control when performing the forced commutation of the motor.

14. The method according to claim 13, further comprising:
- continuing executing of the acceleration control until the motor reaches a maximum rotational frequency when the forced commutation of the motor is performed.

15. A method for a motor drive control, comprising:
- detecting a phase voltage generated in a stator coil of a brushless DC motor;
- estimating a rotational position of a rotor based on the detected phase voltage;
- performing a drive control process of the motor in a first control mode, which is based on the estimated rotational position; and
- changing the drive control process to a second control mode so as to perform a forced commutation of the motor when detecting that an overvoltage is applied to a power source line when the motor is stopped.

16. The method according to claim 15, further comprising:
- changing, from among a plurality of phases, a current applied phase of the motor in a predetermined pattern each time application of overvoltage is detected.

17. The method according to claim 16, further comprising:
- changing, from among the plurality of phases, an initial current applied phase of the motor, the initial current applied phase to which current is applied initially when the drive control process is changed to the second control mode, in the predetermined pattern each time performing the forced commutation.

18. The method according to claim 16, further comprising:
- detecting a temperature of a switching element included in a drive circuit for driving the motor; and
- changing, when performing the forced commutation, an initial current applied phase, to which current is applied initially when the drive control process is changed to the second control mode, in the predetermined pattern so as to avoid a switching element having a highest temperature detected by the temperature sensor.

* * * * *